United States Patent
Bohn

(10) Patent No.: US 12,393,815 B2
(45) Date of Patent: Aug. 19, 2025

(54) SMART LABEL AND SYSTEM MADE UP OF A SMART LABEL AND A SHIELDING ELEMENT

(71) Applicant: etifix GmbH, Grafenberg (DE)

(72) Inventor: Martin Bohn, Reutlingen (DE)

(73) Assignee: etifix GmbH (DE)

( * ) Notice: Subject to any disclaimer, the term of this patent is extended or adjusted under 35 U.S.C. 154(b) by 0 days.

(21) Appl. No.: 18/829,505

(22) Filed: Sep. 10, 2024

(65) Prior Publication Data

US 2025/0086423 A1  Mar. 13, 2025

(30) Foreign Application Priority Data

Sep. 11, 2023  (EP) .................................. 23196620

(51) Int. Cl.
  *G06K 19/077*   (2006.01)
(52) U.S. Cl.
  CPC ............................ *G06K 19/0773* (2013.01)
(58) Field of Classification Search
  CPC . G06K 19/0773; G06K 19/0723; A47G 19/00
  See application file for complete search history.

(56) References Cited

U.S. PATENT DOCUMENTS

| | | | |
|---|---|---|---|
| 2006/0267773 A1 | 11/2006 | Roque | |
| 2011/0155814 A1 | 6/2011 | Kai et al. | |
| 2017/0040665 A1* | 2/2017 | Takashima | H01Q 1/2291 |
| 2018/0189623 A1* | 7/2018 | Forster | G06K 19/0715 |
| 2018/0268277 A1* | 9/2018 | Ji | H01Q 1/2225 |
| 2020/0184300 A1* | 6/2020 | Forster | G06K 19/0717 |
| 2022/0374671 A1* | 11/2022 | Huhtasalo | H01Q 1/38 |
| 2023/0017472 A1* | 1/2023 | Pantaloni | G06K 19/0773 |
| 2023/0169301 A1* | 6/2023 | Nitta | G06K 19/0723 235/492 |
| 2024/0169178 A1* | 5/2024 | Turki | G06K 19/07771 |
| 2024/0232568 A1* | 7/2024 | Forster | B65D 81/3446 |

FOREIGN PATENT DOCUMENTS

| | | | | |
|---|---|---|---|---|
| CA | 2853767 A1 * | 2/2013 | ....... | G06K 19/07749 |
| DE | 102021118103 B3 * | 10/2022 | | |
| EP | 2026253 | 2/2009 | | |
| EP | 4120133 | 1/2023 | | |
| EP | 4220609 A1 * | 8/2023 | ......... | G06K 19/0723 |

OTHER PUBLICATIONS

CN 212302529U—An enhanced anti-fake RFID tag, 13 pages. (Year: 2025).*

* cited by examiner

*Primary Examiner* — Tuyen K Vo
(74) *Attorney, Agent, or Firm* — Pandiscio & Pandiscio

(57) ABSTRACT

For improved durability during use in a microwave oven, and at the same time, good readability of a smart label, it is provided that a flat RFID inlay made up of an RFID chip and an antenna is applied to a metal shield that is made up of at least two mutually overlapping foil sections. A recess in the foil sections is enclosed by the antenna of the RFID inlay. When such a smart label with the metal shield is applied in advance to a microwave dish, and a shielding element that is impermeable to microwave radiation in the microwave oven is temporarily overlaid on the smart label from the opposite side, such a smart label can be used in the microwave oven without damage, but remains readable outside the microwave oven, and without the shielding element.

12 Claims, 2 Drawing Sheets

SMART LABEL AND SYSTEM MADE UP OF A SMART LABEL AND A SHIELDING ELEMENT

REFERENCE TO PENDING PRIOR PATENT APPLICATION

This patent application claims benefit of European Patent Application No. 23196620.1, filed Sep. 11, 2023, which patent application is hereby incorporated herein by reference.

FIELD OF THE INVENTION

The present invention relates to a smart label for use in a microwave oven, comprising an RFID chip, an antenna that is electrically connected thereto, and a flat metal shield, the RFID chip being combined with the antenna to form an inlay that is applied to the metal shield made of multiple foil sections. The present invention further relates to a system made up of a smart label and a shielding element.

BACKGROUND OF THE INVENTION

Such a smart label is already known from EP 4 120 133 A1 by the present applicant. The intent is to employ reusable microwave dishes. These involve packages containing freshly prepared foods that are preferably sold in ready-to-eat form. The product is offered either in a standard dish for immediate consumption, or in the stated reusable microwave dish, which is made of plastic or glass, for example, and is thus easily transportable. The product is generally offered in a deposit system. The smart label is used for identifying the dish as belonging to the business and to a deposit system that is linked thereto, and optionally also for categorizing the dish.

With regard to the prior art, further reference is made to US 2011/155814 A1, US 2006/267773 A1, US 2018/189623 A1, and EP 2 026 253 A1.

It is provided that the microwave dish is associated with the vendor, which supplies the dish to cooperating restaurants, within the scope of a pooling system or rental service. Only dishes that are intended for return, i.e., originally supplied once in the system, are to be accepted for return. However, in the prior art this is achieved using barcodes that are printed on a tag that is affixed to the dish. The barcode is readable in a customary manner using an appropriate reading device, for example a smart phone.

In contrast, an RFID-assisted approach is advantageous, since with such a system, information concerning use cycles, identity of the particular dish part, vendor, material specifications, etc., is available on a decentralized basis.

An RFID inlay comprising an RFID chip and an antenna couples in energy for readout; the energy is provided by the reading device, here as well a smart phone, for example, in an electrical field, and this energy is sufficient for reading the memory of the RFID chip and emitting a response signal via the antenna. However, during heating in the microwave, namely, when the ready-to-eat food is to be reheated, it is problematic that microwave radiation is also coupled into the antenna, and contains enough energy to damage or destroy the RFID chip or the antenna. EP 4 120 133 A1 therefore provides for adhesively bonding the RFID inlay to foil sections that are spaced apart so that the RFID chip and the antenna are shielded on one side, but can still communicate via the open spacings. From the other side, a shielding element in the form of a support base or a collar is necessary, which in the microwave oven temporarily allows shielding of the smart label from the other side as well.

It has been shown that communication in the high-frequency range of 13.56 MHz via the antenna is possible through the spacings between the foil sections, while the foil sections are sufficient to deter the longer-wave microwave radiation. However, it has also been shown that, due to edges and corners in the microwave oven, sparks still occur as the result of local voltage spikes, which likewise may destroy the RFID chip or the antenna.

SUMMARY OF THE INVENTION

Against this background, the object underlying the present invention is to provide a smart label that is reliably shielded on one side and that also allows communication through the one-sided shield, thus avoiding sparking during use in a microwave oven.

This object is achieved by a smart label according to the features of independent claim 1. Meaningful embodiments of such a smart label may be inferred from the associated dependent claims. The object is further achieved by a system made up of such a smart label and a shielding element that is impermeable to microwave radiation.

In this regard, a smart label is provided which, with a shielding element that is impermeable to microwave radiation, is usable as a system in a microwave oven, comprising an RFID chip, an antenna electrically connected thereto, and a flat metal shield, the RFID chip being combined with the antenna to form an inlay that is applied to the metal shield made of multiple foil sections. According to the invention, such a smart label is characterized in that the foil sections are arranged with overlap in sections and have at least one shared recess that is enclosed by the antenna, which crosses overlaps of the foil sections at least twice.

This results in a much smaller gap for the communication; the gap extends between the mutually overlapping layers of the foil sections, but is sufficient for this purpose. Compared to penetration of the foil sections by the microwave radiation, this arrangement is sufficiently protected, so that in the case of encapsulation with the impermeable shielding, the RFID inlay element also cannot be damaged or destroyed in a microwave oven. The resulting edges in the metal shield are not sufficient to generate sparks, and thus allow passage of the electromagnetic field that is generated by the antenna of the reading/writing device, for example the smart phone.

In one specific embodiment, it may be provided that the antenna and the recess have a circular design, with the antenna preferably concentrically enclosing the recess. It has been shown that the signal strength for a circular section and associated antenna is higher, and reading out the RFID chip using such an arrangement is more reliable.

Furthermore, as a specific value, the recess may have a diameter of 5 to 15 mm, and the outer diameter of the metal shield may be 25 to 40 mm. This dimensioning is targeted at the intended main use in conjunction with the use of the smart label on a microwave-safe dish part, whether it is made of glass, plastic, or some other nonmetallic material.

The foil sections of the metal shield may advantageously be made of aluminum foil, which is economical, thin enough for manufacture as a mass-produced product, and easily processed. In addition, it may be provided to apply a plastic layer to this aluminum foil on one side or both sides in order to prevent damage to the aluminum and to act as an electrical insulator. Furthermore, as a result of applying a plastic layer to the overlapping foil sections, at least at the mutually facing sides, the gap between the foil sections through which the high-frequency radiation must pass is slightly widened. The plastic used is particularly preferably polyethylene terephthalate (PET).

It may also be provided that the foil sections have an adhesive layer that is configured for application to a base surface, preferably a microwave dish part, and for mutual adhesive bonding in the area of the overlaps. In principle, it is also possible to initially apply the foil sections to a shared substrate, which with an adhesive layer may be applied to the microwave dish. The adhesive layer may have a backing paper, in particular a siliconized substrate material, in a manner known per se which protects the adhesive layer prior to use.

In one specific embodiment, it may be further provided that the overlaps have an overlap width of 1 to 5 mm. It has been shown that communication may pass particularly well through such overlaps without the microwave energy being coupled into the antenna and the RFID chip. The RFID inlay is adhesively bonded to the metal shield, with a side facing the RFID chip being coated with an adhesive layer. It is also possible to lastly coat the smart label with a printed or unprinted cover layer, preferably made of cast acrylate, in order to protect it as effectively as possible from mechanical and thermal effects.

The RFID inlay may preferably be an inlay for use in the high-frequency range around 13.56 MHz. The shielding keeps the microwave radiation in the microwave oven away from the RFID inlay, but allows communication outside the microwave oven.

It may also be meaningful for the RFID chip to have a writing/reading area. With such a memory area, the memory of the RFID chip may be addressed so that any temporary information may be kept in such an area. If it is provided that the writing area has deletion protection, for example owner data may be stored which in a later write cycle can no longer be altered by a programming device. Another possibility is for the RFID chip to have a counter in the writing/reading area which can only be read out and incremented by a programming device. This ensures that, for example when the microwave dish is used and thus purchased, the counter is incremented by one, so that the age and the use cycles of the dish are identifiable. Such an inlay may be read out and/or programmed using a near-field communication (NFC)-capable smart phone.

The invention described above is explained in greater detail below with reference to one exemplary embodiment.

BRIEF DESCRIPTION OF THE DRAWINGS

In the figures.

DETAILED DESCRIPTION OF THE PREFERRED EMBODIMENTS

Figure 1:
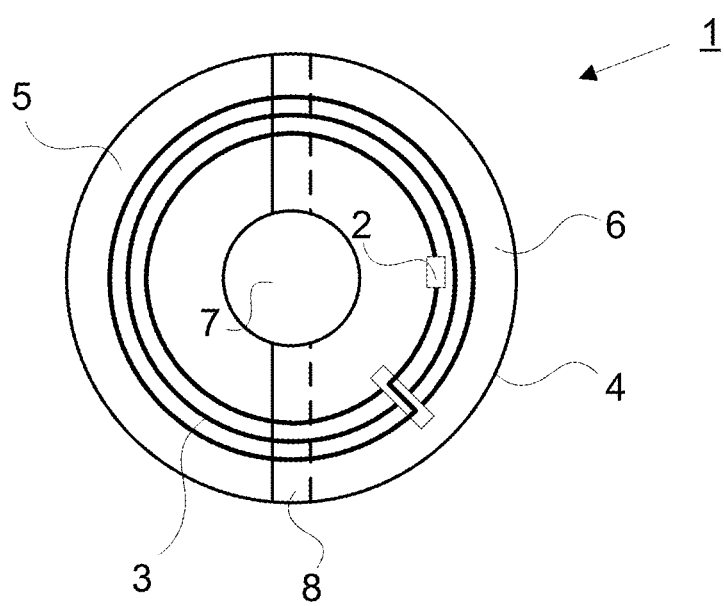
FIG. 1 shows a smart label according to the invention in a schematic illustration, in a top view of an inlay prior to application of a cover layer.

FIG. 1 shows a smart label 1 that is configured for use on a microwave dish, prior to application of a mechanically and thermally protective cover layer 9. For this purpose, with a bottom side facing away from the observer, to which an adhesive layer 10 is applied, the smart label 1 is affixed to such a microwave dish. The smart label 1 comprises an RFID chip 2 for communication with a reading device and/or programming device, which is of no further interest here. The RFID chip 2 achieves this communication with the aid of an antenna 3 that is arranged around a recess 7. The RFID chip 2 and the antenna 3 are combined to form an inlay 4, as is customary for roll-to-roll processing. The recess 7 is provided at least in a metal shield that is formed from a first foil section 5 and a second foil section 6. The first foil section 5 is overlapped by the second foil section 6, the overlap area being wide enough so that microwave radiation acting on the metal shield is not able to penetrate through the overlap 8. Conversely, the overlap area is only wide enough to allow electromagnetic waves, emitted by the RFID chip 2 with the aid of the antenna 3, to pass through the overlap 8. Communication through the overlap 8 is thus possible, but penetration by the microwave radiation and accompanying damage to the RFID chip 2 or the antenna 3 by incoupling of this high-energy radiation or due to sparking is not possible.

Figure 2:
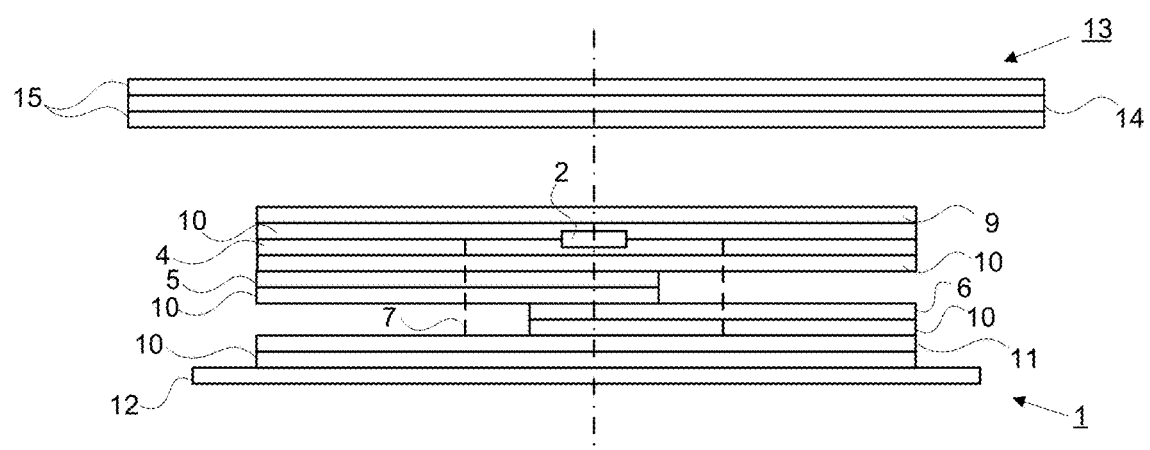
FIG. 2 shows the smart label in a schematic cross-sectional illustration.

In this way, an inlay containing an RFID chip 2 that is protected on one side may be associated with the microwave dish, and the RFID can communicate through its shield. By means of a second part, i.e., a shielding element 13 that is impermeable to microwave radiation as shown in FIG. 2, complete encapsulation of the RFID chip 2 can be achieved when both the shielding element 13 and the metal shield are larger than the antenna 3. Such a shielding element 13, as a support base, for example, may be situated below the dish part that is provided at its bottom side with the smart label 1, and when the smart label 1 is attached to a side of the dish part, the shielding element 13 may be designed as a collar. The shielding element is preferably designed as an aluminum layer 14, as illustrated in FIG. 2, that is covered on both sides with a paper and/or foil layer 15. A detachable adhesive sticker may also be provided as a shielding element 13, which is locally adhered to the smart label 1 until the action of microwave radiation on the smart label 1 has ceased.

In addition to the shielding element 13, FIG. 2 shows a schematic sectional illustration of the smart label 1. Two foil sections 5 and 6 are provided here, each being made of aluminum foil and in each case having a plastic layer made of polyethylene terephthalate, for example, on both sides. Adhesive layers 10 are provided between each of the individual layers of the structure. The inlay 4 made up of the antenna 3 and the RFID chip 2 is situated on the foil sections 5 and 6 with an adhesive layer 10 in between, whereas the smart label 1 terminates at the top with a cover layer 9 that is preferably made of cast acrylate. At the bottom a foil layer 11 is provided, which via a further adhesive layer 10 is applied to a siliconized substrate sheet 12, and after removal of same, the smart label 1 may be placed at a suitable location, for example on a microwave dish part.

Thus, a smart label is described above which is reliably shielded on one side, and which allows communication through the one-sided shield, thereby avoiding sparking even when used in a microwave oven.

LIST OF REFERENCE NUMERALS 1 smart label
2 RFID chip
3 antenna
4 inlay
5 first foil section
6 second foil section
7 recess
8 overlap
9 cover layer
10 adhesive layer 11 foil layer
12 siliconized substrate sheet
13 shielding element
14 aluminum layer
15 paper and/or foil layer

What is claimed is:

1. A smart label for use in a microwave oven, comprising an RFID chip (2), an antenna (3) that is electrically connected thereto, and a flat metal shield made up of multiple foil sections (5, 6), the RFID chip (2) being combined with the antenna (3) to form an inlay (4) that is applied to the metal shield, characterized in that the foil sections (5, 6) are arranged with overlap in sections and have at least one shared recess (7) that is enclosed by the antenna (3), wherein the antenna (3) crosses overlaps (8) of the foil sections (5, 6) at least twice.

2. The smart label according to claim 1, characterized in that the antenna (3) and the recess (7) have a circular design, with the antenna (3) enclosing the recess (7).

3. The smart label according to claim 1, characterized in that the recess (7) has a diameter of 5 to 15 mm, and the outer diameter of the metal shield is 25 to 40 mm.

4. The smart label according to claim 1, characterized in that the foil sections (5, 6) of the metal shield are made of aluminum foil.

5. The smart label according to claim 1, characterized in that the foil sections (5, 6) are provided with a plastic layer on one side or both sides.

6. The smart label according to claim 1, characterized in that the foil sections (5, 6) have an adhesive layer (10) that is configured for application to a base surface, and for mutual adhesive bonding in the area of the overlaps (8).

7. The smart label according to claim 1, characterized in that the overlaps (8) have an overlap width of 1 to 5 mm.

8. The smart label according to claim 1, characterized in that the RFID inlay (4) is configured for frequencies of the RFID chip (2) in the range of 13.56 MHz.

9. The smart label according to claim 1, characterized in that the RFID inlay (4) has a writing/reading area that may be programmed and read out using an NFC-capable smart phone.

10. The smart label according to claim 9, characterized in that the RFID chip (2) has a counter in the writing/reading area which can only be read out and incremented by a programming device.

11. The smart label according to claim 1, characterized in that the smart label is coated with a cover layer (9) made of printed or unprinted cast acrylate.

12. A system comprising a smart label according to claim 1, and a shielding element that is impermeable to microwave radiation.

* * * * *